(12) United States Patent
Baugh

(10) Patent No.: US 6,415,866 B1
(45) Date of Patent: Jul. 9, 2002

(54) THERMAL OPERATING MODULE WITH SCAVENGER SYSTEM

(76) Inventor: Benton F. Baugh, 14626 Oak Bend, Houston, TX (US) 77079-6441

( * ) Notice: Subject to any disclaimer, the term of this patent is extended or adjusted under 35 U.S.C. 154(b) by 0 days.

(21) Appl. No.: 09/517,114

(22) Filed: Mar. 7, 2000

(51) Int. Cl.⁷ ............................................... E21B 21/00
(52) U.S. Cl. ..................... 166/304; 166/57; 166/312; 237/12.1
(58) Field of Search .............................. 166/244.1, 268, 166/272.1, 302, 304, 311, 312, 57; 237/12.1, 12.3 B

(56) References Cited

U.S. PATENT DOCUMENTS

| | | |
|---|---|---|
| 3,156,299 A | 11/1964 | Trantham |
| 3,522,843 A | 8/1970 | New |
| 3,658,270 A | 4/1972 | Slator et al. |
| 3,833,059 A | 9/1974 | Sisson |
| 4,044,549 A | 8/1977 | Zwick |
| 4,197,712 A | 4/1980 | Zwick et al. |
| 4,214,450 A | * 7/1980 | Nagashima et al. |
| 4,255,116 A | 3/1981 | Zwick |
| 4,290,271 A | 9/1981 | Grainger |
| 4,373,896 A | 2/1983 | Zwick et al. |
| 4,454,917 A | 6/1984 | Poston |
| 4,472,946 A | 9/1984 | Zwick |
| 4,480,695 A | 11/1984 | Anderson |
| 4,546,610 A | 10/1985 | Zwick |
| 4,589,488 A | 5/1986 | Schirmer |
| 4,655,285 A | 4/1987 | Spitzer |
| 4,860,545 A | 8/1989 | Zwick et al. |
| 4,882,009 A | 11/1989 | Santoleri et al. |
| 4,924,679 A | 5/1990 | Brigham et al. |
| 4,925,092 A | * 5/1990 | Yoshida et al. |
| 5,056,315 A | 10/1991 | Jenkins |
| 5,215,454 A | 6/1993 | Ferramola et al. |
| 5,242,133 A | 9/1993 | Zwick |
| 5,261,765 A | 11/1993 | Nelson |
| 5,282,590 A | 2/1994 | Zwick |
| 5,335,728 A | 8/1994 | Straham |
| 5,388,650 A | 2/1995 | Michael |
| 5,656,136 A | 8/1997 | Gayaut et al. |
| 6,073,695 A | 6/2000 | Crawford et al. |

* cited by examiner

Primary Examiner—Roger Schoeppel

(57) ABSTRACT

A method of taking the energy from the radiator water, exhaust gas system, and/or the mechanical work from the drive shaft of a thermal module and transferring it to a fluid from a tank for the purpose of heating the fluid in the tank, and scavenging the additional energy from the radiator water, exhaust gas system, and/or mechanical work from the drive shaft of a separate system to supplement the energy from the thermal module for the purpose of greater heating the fluid from the tank.

20 Claims, 4 Drawing Sheets

THERMAL OPERATING MODULE WITH SCAVENGER SYSTEM

BACKGROUND OF THE INVENTION

This invention relates to methods for treating a well bore or pipeline. More particularly, but not by way of limitation, this invention relates to methods for collecting heat from multiple engines and heating fluids and thereafter placing the fluids in a well bore or pipeline for purposes of treating the well bore or pipeline.

In the exploration and development of hydrocarbon reservoirs, a well is drilled to a subterranean reservoir, and thereafter, a tubing string is placed within said well for the production of hydrocarbon fluids and gas, as is well understood by those of ordinary skill in the art. As the search for additional reserves continues, offshore and remote areas are being explored, drilled and produced with increased frequency. During the production phase, the production tubing and pipelines may have deposited within the internal diameter such FLUIDs as paraffin, hydrates, asphaltines, and general scale which are precipitated from the formation fluids and gas during the temperature and pressure drops associated with production.

Both the treatment of tubing string and the pipelines may be accomplished by the injection of specific fluids. The effect of the treating fluids will many times be enhanced by heating the treating fluid. Thus, for the treatment of paraffin and asphaltines, the heating of a specific treating fluids (e.g. diesel) enhances the removal.

In order to heat these types of fluids, operators frequently utilize an open or enclosed flame. However, government regulations have either banned or limited the use of open or enclosed flames on offshore locations and some land locations. Thus, there is a need for a thermal fluid unit that will heat a treating fluid without the need for having an open flame. There is also a need for a method of treating well bores with a heated treating fluid.

SUMMARY OF THE INVENTION

A method of heating a treating fluid used in a well bore having a tubing string or a pipeline is disclosed. The method will comprise providing a diesel engine that produces heat as a result of its operation. The engine will in turn produce a gas exhaust, a water exhaust, and/or a hydraulic oil exhaust from the primary engine of this invention and will further scavenge gas exhaust, water exhaust, and/or hydraulic oil exhaust from one or more other engines in the area.

The method would further include channeling the gas exhaust to a gas exhaust heat exchanger, and channeling the water exhaust to a water exhaust heat exchanger. The method may also include producing a hydraulic oil exhaust from the diesel engine and channeling the hydraulic oil exhaust to a hydraulic oil heat exchanger. Next, the treating fluid is directed into the hydraulic oil heat exchanger, and the treating fluid is heated in the hydraulic oil heat exchanger.

The method may further comprise flowing the treating fluid into the gas exhaust heat exchanger and heating the treating fluid in the gas exhaust heat exchanger. The operator may then inject the treating fluid into the well bore for treatment in accordance with the teachings of the present invention.

The treating fluids may be fluids taken from the well bore or pipeline and simply recirculated after being heated by apparatus of the present invention. Alternately, the treating fluids may be a variety of other fluids, including diesel fuel, hydrochloric acid, hydrofluoric acid, or other processed hydrocarbons.

Also disclosed herein is an apparatus for heating a treating fluid used in a oil and gas well bore or pipeline. The apparatus comprises a diesel engine that produces a heat source while in operation. The engine has a gas exhaust line, and a water exhaust line. The apparatus further includes a water heat exchanger means, operatively associated with the water exhaust line, for exchanging the heat of the water with a set of water heat exchange coils; and, a gas heat exchanger means, operatively associated with the gas exhaust line, for exchanging the heat of the gas with a set of water heat exchange coils.

The apparatus may also contain a hydraulic oil line that has operatively associated therewith a hydraulic oil pump means for pumping hydraulic oil from the engine into the hydraulic oil heat exchanger and further associated therewith a hydraulic back pressure control means for controlling the back pressure of the engine.

The apparatus may also contain means for connecting to other engines in the area of the primary engine which collect some portion of the heat from the water exhaust, gas exhaust, or hydraulic exhaust from the other engines.

An advantage of the present invention is that it allows a relatively small engine to drive the operation of the thermal module, and allows larger and more expensive engines in the area to provide a percentage of the heat to heat the treating fluids. As this heat is normally dumped to the environment, it is effectively getting a supply of heat for no cost, other than connecting to it.

Another advantage of the present invention includes it effectively removes paraffin, asphaltines and general scale deposits through the novel heating process. Another advantage is that fluids are heated in a single pass with continuous flow at temperatures of 180 degrees Fahrenheit up to and exceeding 300 degrees Fahrenheit without the aid of an open or enclosed flame. Yet another advantage is that because of the elimination of the open flame, the operator is no longer limited to use of heated water and chemicals for cleaning tubing and pipelines i.e. hydrocarbons can be used as the treating fluid to be heated.

Another advantage is that hydrocarbons (such as diesel fuel) can be applied through the novel apparatus without the danger of exposure to open or enclosed flames. Yet another advantage is that with the use of heated hydrocarbons, the chemical consumption can be greatly reduced thus providing an economical method for paraffin and asphaltine clean outs. Of course, the novel system can still be used as means for heating chemicals and water for treatment of the tubing, pipeline, or alternatively, stimulating the reservoir.

A feature of the present invention is the system may be used with coiled tubing. Still yet another feature is that the system is self-contained and is readily available for transportation to remote locations with minimal amount of space.

SUMMARY OF THE INVENTION

The object of this invention is to provide a module for the heating of a treating fluid for the purpose of servicing oil and gas wells and pipeline.

A second object of the present invention is utilize as small an engine as possible for the construction of the unit to reduce the cost of manufacture of the unit and the size of the unit.

A third object of the present invention is to supplement the heat generation of the relatively small engine of the unit with other the scavenging of rejected heat of larger engines typically a part of oil and gas service operations.

Another object of the present invention is offer the versatility of supplementing the heat generation of the small engine with the ability to scavenge radiator heat and/or exhaust gas heat and/or crankshaft torque energy from the adjacent engines as most easily suits the situation at the time.

Another object of the invention is have the treating fluid storage and treating fluid pressure pumping means separate from the thermal module to reduce the size and cost of the thermal module.

DESCRIPTION OF THE PREFERRED EMBODIMENT

Figure 1:
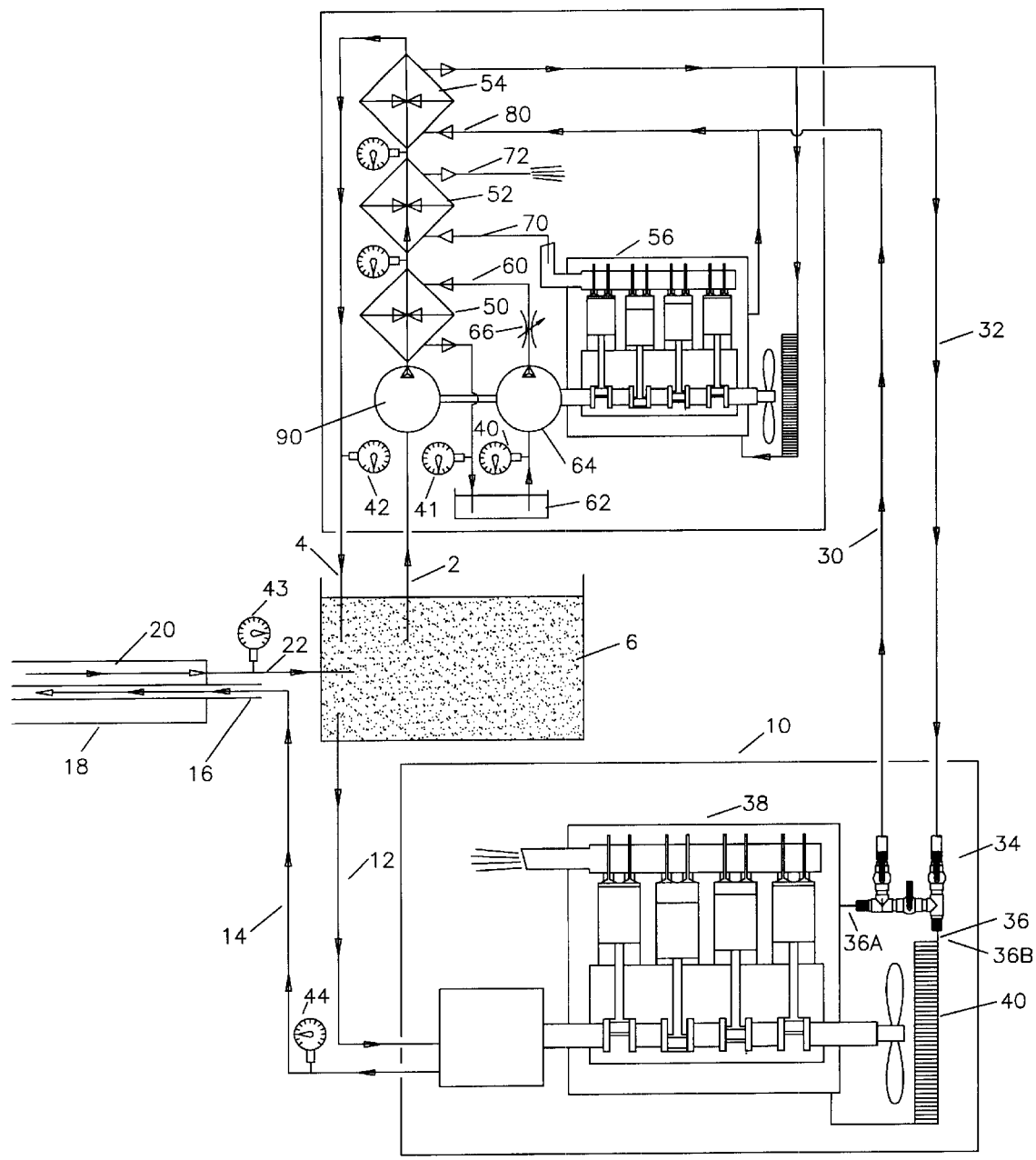
FIG. 1 is a schematic of a pumping system embodying the present invention.

Referring now to FIG. 1, a thermal operating module 1 is shown interconnected by suction line 2 and return line 4 with fluid tank 6.

Pumping module 10 is interconnected with fluid tank 6 by suction line 12 and connects the pumping line 14 with a coiled tubing 16 entering pipeline 18. The annular area 20 of pipeline 18 is connected back to fluid tank 6 by line 22.

Pumping module 10 is also connected to surface thermal operating module 1 by pressure line 30 and return line 32 which connect to valve package 34. Valve package 34 is inserted into the radiator line 36 between engine 38 and radiator 40 of pumping module 10. The portion of radiator line 36 upstream of the valve package 34 is referred to as 36A and the portion downstream of valve package 34 is 36B.

Temperature gages or sensors are provided at 40, 41, 42, 43,and 44 to monitor the heating and operations of the process.

Thermal module 1 provides three separate heat exchangers 50, 52, and 54 for inputting heat into fluid coming from fluid tank 6 by suction line 2 and returning to fluid tank 6 by return line 4. It also provides an engine 56 to power the operations of the module.

Heat exchanger 50 accepts heated fluid from input line 60 which comes from reservoir 62, through pump 64, and through orifice 66. As is well known in the industry, when pressure is dropped across an orifice, the energy of the pressure is converted into heat in the fluid. Within the heat exchanger 50, this heat is transferred into the fluid coming from tank 6.

Heat exchanger 52 accepts the hot gases from the exhaust system of engine 56 through line 70 and transfers this heat into the fluid coming from tank 6 through the first heat exchanger 50. After heat is accepted from the hot exhaust gas, the cooled gases are vented to the atmosphere through line 72.

Heat exchanger 54 accepts the hot water from the engine water jacket through line 80 and transfers this heat to the fluid coming from tank 6 through heat exchanger 50 and the through heat exchanger 52.

After the fluid from tank 6 passes through heat exchangers 50, 52, and 54, it is returned to tank 6 to increase the overall temperature of the fluids in tank 6. As the fluids are continuously circulated by pump 90 through the heat exchangers, the fluid becomes hotter and hotter until the desired working temperature is desired.

The heating process as discussed will be suitable in some cases, however, it is advantageous to have additional heat energy available to more quickly heat the tank 6 fluids up to the desired temperature, or to maintain the high temperature during ongoing operations. A solution to this is to simply purchase bigger engines and skids, however, it can be an expensive and space consuming solution. An alternate solution can be to recognize that there are commonly other engines around which are generating heat energy also. If that heat can be captured for this process, the range of operations of a smaller engine skid can be increased.

Pumping skid module 10 is such a skid with an engine which would be associated with the larger fluid tanks. It will characteristically generate heat rejected by the radiator and by the exhaust system. Additionally, it will commonly have surplus horsepower of fluid pressure which can be converted into heat.

FIG. 1 illustrates cutting the hot radiator line 36 from the engine 38 to the radiator 40 and inserting a valve package 34 to divert the hot radiator water through line 30 to heat exchanger 54 to supplement the flow from the smaller engine 56. After heat is exchanged into the fluid being circulated from tank 6, the radiator water is circulated back into the radiator 40 of engine 38 through line 32. In this way, heat is scavenged from other engines in the area to supplement the heat which can be taken from the smaller engine on the thermal operating module 1.

Figure 2:
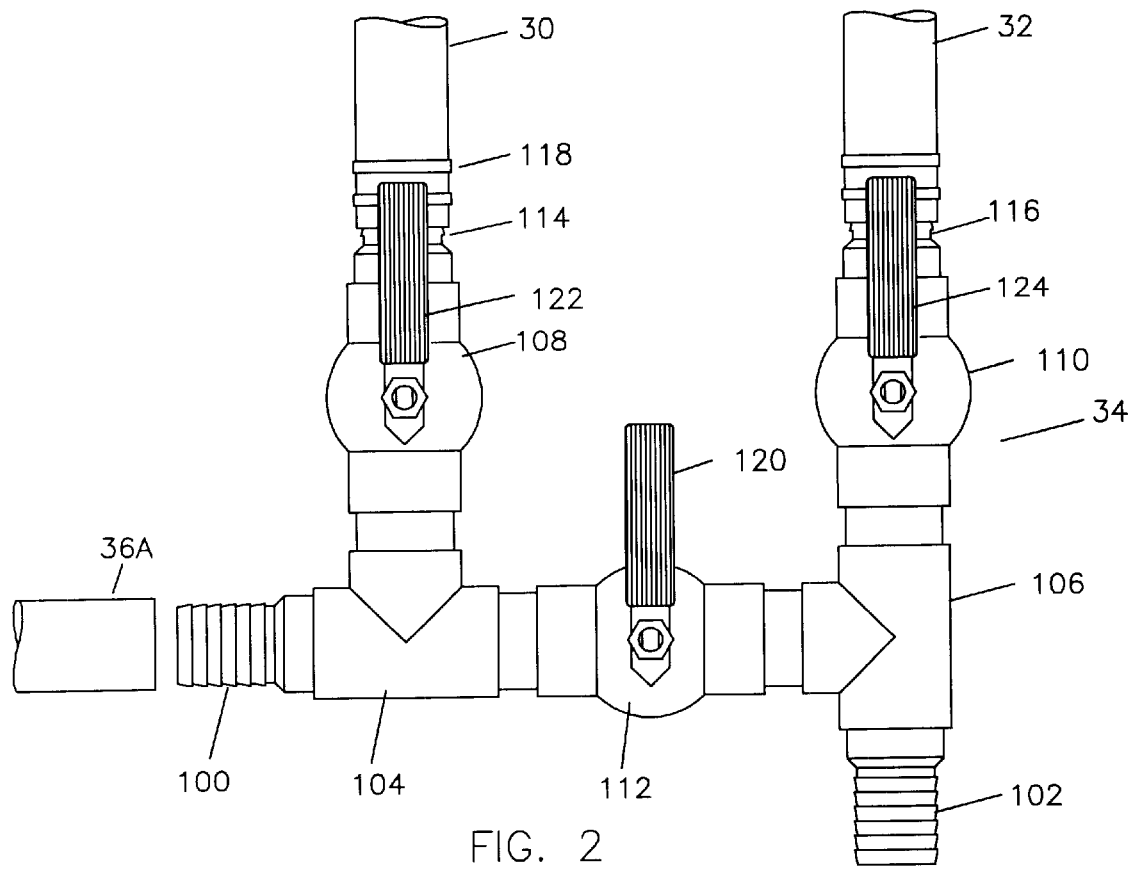
FIG. 2 is a drawing of a valve package used in the invention to direct radiator cooling water alternately to the normal radiator of a pumping or other skid or to the heat exchangers of this invention.

FIG. 2 illustrates the valve package 34 in greater detail showing king nipples 100 and 102 being prepared to receive the hose portions 36A and 36B respectively. Tees 104 and 106 and ball valves 108, 110, and 112 are assembled and interconnected with threaded nipples. King nipples 114 and 116 are connected to the end of ball valves 108 and 110 respectively with hoses 30 and 32 attached. Band clamps or similar devices as shown at 118 secure the hoses to the King nipples.

Handle 120 is shown at a right angle to the flow path, indicating conventionally that the ball valve 112 is closed to flow. Handles 122 and 124 are shown parallel to the flow, indicating conventionally that the ball valves 108 and 110 are open to flow. In this configuration, the flow coming form hose portion 36A from engine 38 would be diverted to hose 30, later returning through hose 32 to hose portion 36B.

Referring again to FIG. 1, the valve package 34 is shown with the valves in the appropriate positions for diverting water flow to the thermal module 10 and back again.

Similar scavenging can be done with respect to the exhaust system and the pumping system of pumping skid 10, however, only the radiator water scavenging is discussed in detail in this description.

Figure 3:
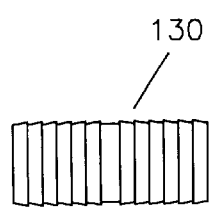
FIG. 3 is a drawing of a tube member which can be inserted into a radiator hose which has been cut to install a valve package similar to that illustrated in FIG. 2 for the purpose of returning the hose to the original operating characteristics.

Referring now to FIG. 3, a short tube section 130 is shown with the buttress profile common to the King nipples, except in opposing directions. In many cases the valve package 34 will be desired to be left with the pumping module 10 for future service operations. In some cases, it may be preferred to remove the valve module 34. In this case, a short tube section 130 can be used to "repair" the radiator hose 36 by simply inserting it into the cut ends of the hose and installing clamps similar to band clamps 118.

Figure 4:
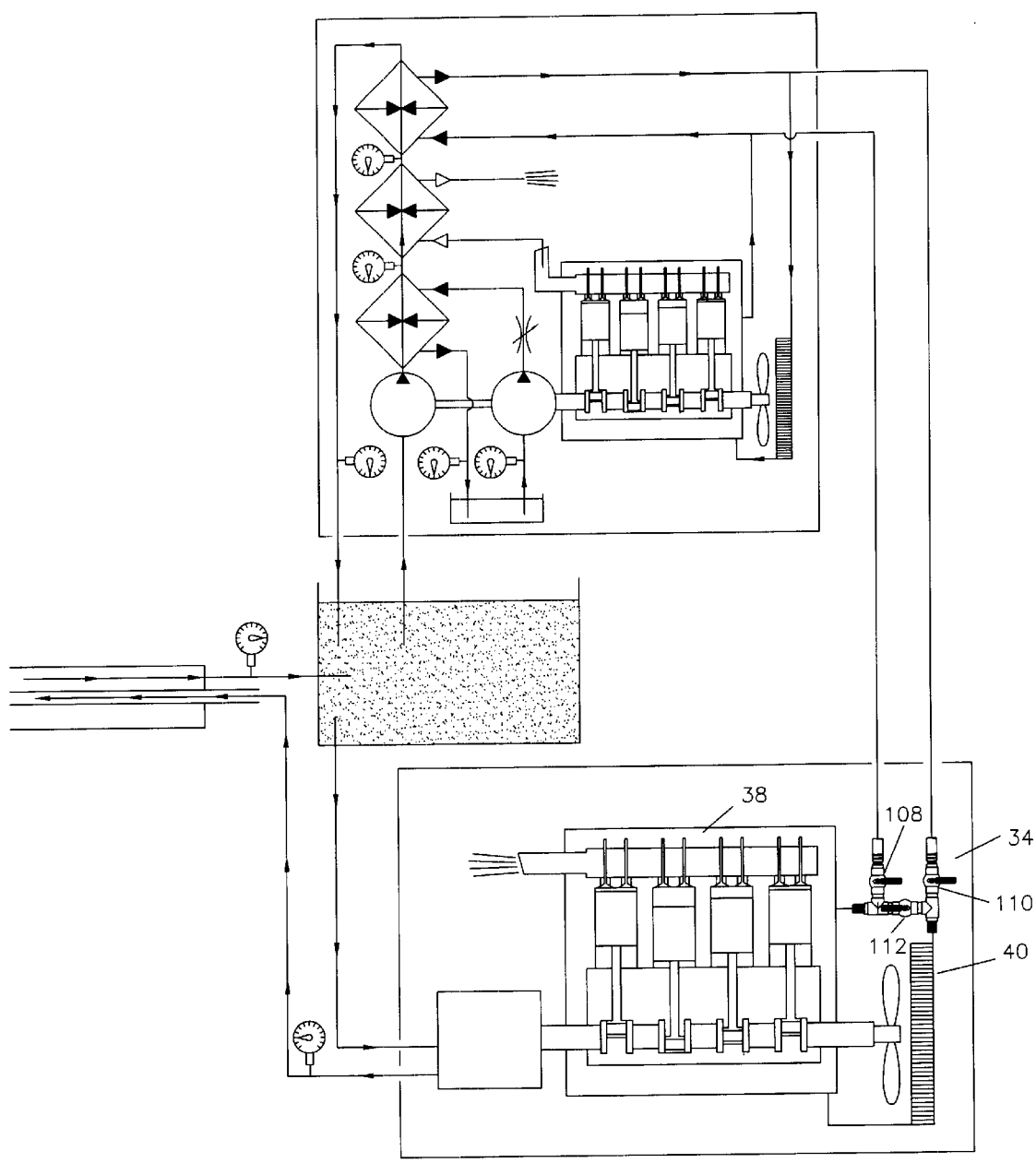
FIG. 4 is a schematic of the pumping system of FIG. 1 where the valves of the valve package are changed to a position where the radiator fluid is not directed to the thermal module of this invention, but rather to the normal radiator.

FIG. 4 illustrates the same equipment as FIG. 1, except the handles of valves 108, 110, and 112 are in the alternate positions allowing the radiator water to flow directly from the engine 38 to the radiator 40 when scavenged heat energy is not required by thermal module 1.

Figure 5:
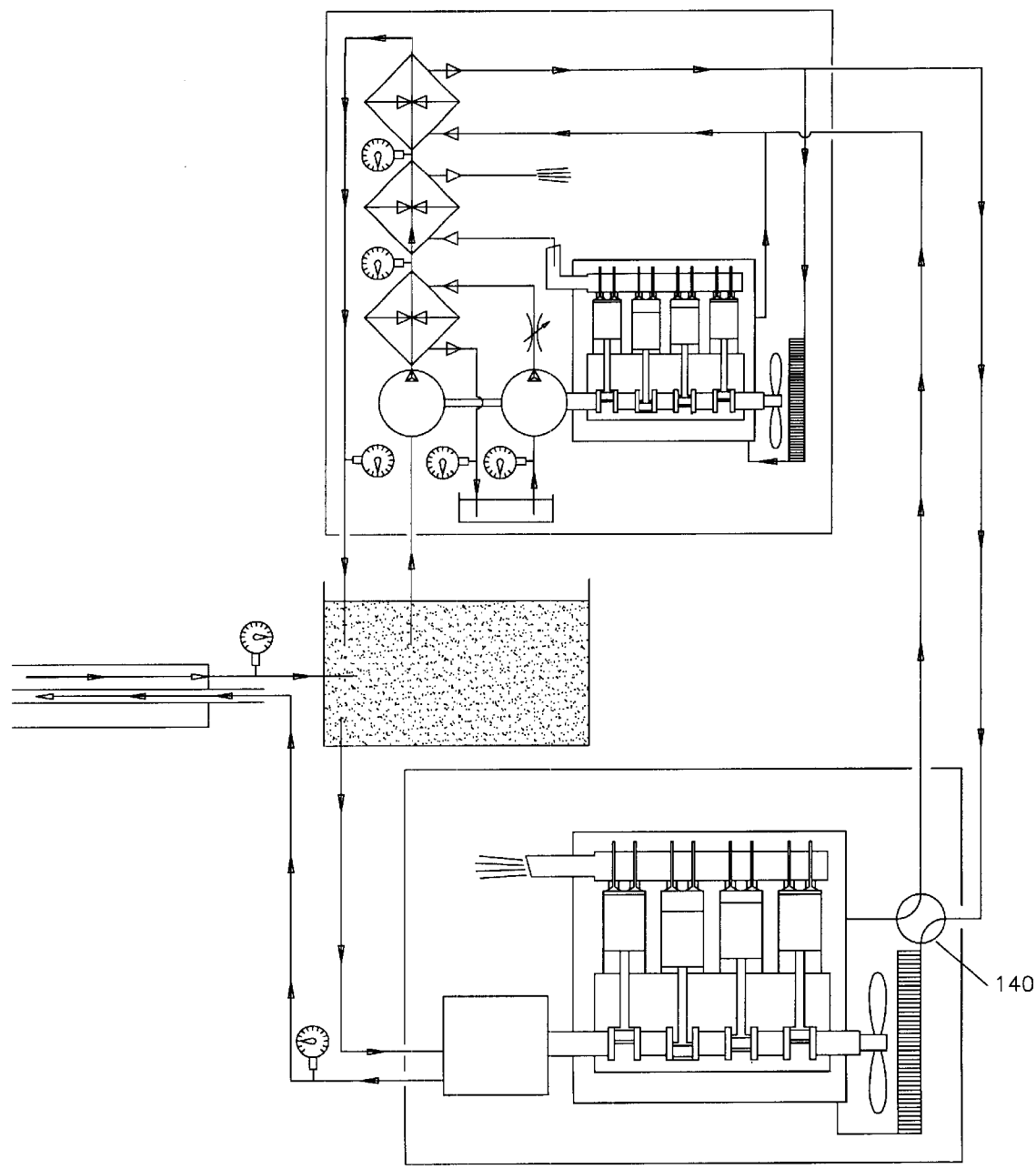
FIG. 5 is a schematic similar to FIGS. 1 and 4, showing a single valve concept replacing the valve package show in FIGS. 1 and 4.

FIG. 5 shows graphically a valve 140 replacing the valve package 34 which is a single valve which can be operated to achieve the changes in flow paths as described in FIGS. 1, 2, and 4. If this were a rotary valve, the change could be achieved by rotating a disk by 90 degrees. If this were a spool valve, the change could occur by a simple axial movement of a spool as is well known in the art.

The preceding description is taking energy from the radiator water system of the second engine by diverting the radiator water flow. Similarly, energy can be derived by diverting the exhaust gas flow or the pumping pressure flow of the second engine to the heat exchangers.

The foregoing disclosure and description of this invention are illustrative and explanatory thereof, and various changes in the size, shape, and materials as well as the details of the illustrated construction may be made without departing from the spirit of the invention.

What is claimed is:

1. A method of heating a treating fluid for the purpose of pipeline or down hole well service operations, comprising
having an assembly of a first engine and one or more heat exchangers,
circulating said treating fluid to be heated through said one or more heat exchangers,
heating said treating fluid in said heat exchangers with energy from the radiator water, the exhaust gas, or the crankshaft rotation from said first engine, and
inputting additional heat energy into one of said one or more heat exchangers from the radiator water, the exhaust gas system, or the crankshaft of a second engine to assist in the process of heating said treating fluid.

2. The invention of claim 1, wherein said radiator water of said second engine and said radiator water of said first engine flow into the same of one or more of said heat exchangers to heat said treating fluid.

3. The invention of claim 2, wherein said energy from said radiator water of said second engine is derived from said radiator water of said second engine by lowering the temperature of said radiator water of said second engine in said heat exchanger.

4. The invention of claim 1, wherein said exhaust gas of said second engine and said exhaust gas of said first engine flow into the same of one or more of said heat exchangers to heat said treating fluid.

5. The invention of claim 4, wherein said energy from said exhaust gas of said second engine is derived from said exhaust gas of said second engine by lowering the temperature of said exhaust gas of said second engine in said heat exchanger.

6. The invention of claim 1, wherein said energy from crankshaft rotation of said first engine and said energy from crankshaft rotation from said second engine flow into the same of one or more of said heat exchangers to heat said treating fluid.

7. The invention of claim 6, wherein said energy from said crankshaft rotation of said second engine is derived by said crankshaft turning a pump which produces a pressure on a heating fluid and said pressure on said heating fluid is reduced by flowing through an orifice means thereby turning the said crankshaft rotation into heat energy.

8. The invention of claim 7 wherein said orifice is a variable sized orifice.

9. The invention of claim 6, wherein said heating fluid from said second engine is a different fluid from said treating fluid.

10. The invention of claim 9, wherein said heating fluid is circulated in a tank mounted on said assembly and said treating fluid is not circulated in a tank on said assembly.

11. The invention of claim 1, wherein said first engine powers a pump to circulate said treating fluid from a treating tank, thru said heat exchangers, and back to said treating tank.

12. The invention of claim 11, wherein said treating tank is not a part of said assembly.

13. The invention of claim 1, wherein said second engine powers pumps for pumping said treating fluid into said pipeline or said downhole service operations.

14. The invention of claim 1, wherein said assembly, said treating fluid, and said second engine are mounted on separate skids.

15. A method of heating a treating fluid for the purpose of pipeline or down hole well service operations, comprising
having an assembly of a first engine and one or more heat exchangers,
circulating said treating fluid to be heated through said one or more heat exchangers,
heating said treating fluid in said heat exchangers with energy from the radiator water, the exhaust gas, or the crankshaft rotation from said first engine, and
inserting diverter valving in the flow path between a second engine and the radiator of said second engine to divert the hot water flow from said second engine to one or more of said heat exchangers on said assembly in order to heat said treating fluid.

16. The invention of claim 15, wherein radiator water of said first engine and said hot water of said second engine flow to the same of said one or more heat exchangers.

17. The invention of claim 15, wherein the radiator hose line between said second engine and said radiator of said second engine is cut for the purpose of installing said diverter valving.

18. The invention of claim 15, wherein said diverter valving has alternate flow positions of diverting said hot water flow to one of said one or more heat exchangers on said assembly or not diverting said hot water flow to said heat exchanger on said assembly.

19. The invention of claim 16, wherein said exhaust gas from said first engine and the exhaust gas of said second engine are directed to the same of said one or more heat exchangers.

20. A method of heating a treating fluid for the purpose of pipeline or down hole well service operations, comprising
having an assembly of a first engine and one or more heat exchangers,
circulating said treating fluid to be heated through said one or more heat exchangers,
heating said treating fluid in said heat exchangers with energy from the radiator water, the exhaust gas, or the crankshaft rotation from said first engine, and
inserting piping onto the exhaust system of a second engine to direct the exhaust gas from said second engine to one of said one or more heat exchangers on said assembly in order to heat said treating fluid.

* * * * *